United States Patent

Hagman

Patent Number: 5,738,344
Date of Patent: Apr. 14, 1998

[54] ERGONOMIC WORKPIECE POSITIONER

[76] Inventor: Erland Hagman, 11 Old Newtown Rd., Danbury, Conn. 06811

[21] Appl. No.: 625,871

[22] Filed: Apr. 1, 1996

[51] Int. Cl.[6] .................................................. B23Q 1/04
[52] U.S. Cl. .......................................... 269/75; 269/20
[58] Field of Search ............................. 269/45, 71, 75, 269/81–83, 20; 248/181.1, 181.2, 288.31, 288.51, 180, 481, 483

[56] References Cited

U.S. PATENT DOCUMENTS

| | | | |
|---|---|---|---|
| 2,673,054 | 3/1954 | Slavik | 248/181.1 |
| 2,993,395 | 7/1961 | Bohn | 248/181.1 |
| 3,622,112 | 11/1971 | Stroh | 248/181.1 |
| 5,314,174 | 5/1994 | Hagman | 269/20 |
| 5,544,968 | 8/1996 | Goellner | 248/181.1 |

Primary Examiner—Robert C. Watson
Attorney, Agent, or Firm—Edward R. Hyde

[57] ABSTRACT

A workpiece support is provided that is locked in its normal state. A balanced system of spring force is provided to lock the positioner in a chosen position. It will remain in the selected position until fluid pressure is provided to release it. The unit is designed to provide a large surface area for the fluid pressure.

12 Claims, 4 Drawing Sheets

ERGONOMIC WORKPIECE POSITIONER

BACKGROUND OF THE INVENTION

1. Field of the Invention

The present invention relates to a universal workpiece positioner and more particularly to a holder for a workpiece to be operated upon in which the workpiece may be moved and retained in a desired position.

In the manufacture of various items it is often necessary to position the item to conveniently perform an operation upon it such as welding, painting, forming, assembling, etc. The items may take various forms and sizes and may be small such as a circuit board or as large as perhaps a section of an automobile body.

Accordingly, it is desirable to have a workholder to which a large variety of items to be worked upon may be secured and in which the workholder may be freely adjusted to position the item in an ergonomically correct work position for the operation to be performed.

2. Description of The Prior Art

Applicants U.S. Pat. No. 5,314,174 describes an ergonomic workpiece positioner for securing workpieces in a particular desired predetermined position employing a spring pneumatic control system. One feature of this system is that in its normal or neutral condition, in which the external pneumatic pressure is not present, the workpiece is firmly held in a fixed locked position. Thus, a workpiece will not change position unless sufficient pneumatic force is provided to release it for movement to another position. This is an important safety feature of applicant's prior patent which has wide utility as a workpiece holder.

However, it has been found that for a given pneumatic release pressure the prior design limited the workholders load capacity. The reason is that the unbalance between spring force and pneumatic force required for release of a heavy workpiece in position demanded a high pneumatic force for proper release. This, in turn, requires a positioner allowing generation of a strong total pneumatic release force within the dimensional limitations of a practical design.

SUMMARY OF THE INVENTION

The present system contemplates a workpiece holding device that is selectively held in position and released by a spring-fluid system acting upon a piston that, in turn, holds and releases the workpiece under an infinite variable degree of movement friction. In the normal condition the spring network urges the piston in an upward direction to lock the workpiece in any desired position or physical orientation for the operator to conveniently perform a fabrication or other work function on the workpiece. Then when it is desired to release the workpiece for re-orientation, a variable fluid pressure is applied to the piston to actuate it against the force of the fixed spring network. This fluid pressure is applied to a circular surface area formed in the piston's circumference.

The design of the piston of the present invention provides a considerably larger surface area than in the prior art design, permitting a greater total fluid pressure for a given workholder size, in turn permitting a larger spring network to hold workpieces of greater weight.

Accordingly it is a primary object of the present invention to provide an improved workpiece positioner adapted to safely hold in position workpieces of heavier weights within fixed dimensional limitations.

A further object of the present invention is to provide a workpiece positioner of the spring-fluid pressure type design providing a high total fluid release pressure and a correspondingly high spring holding pressure.

A further object of the present invention is to provide a workpiece positioner in which the piston design provides a large surface area for fluid under pressure to actuate the piston.

A further object of the present invention is to provide a safe universal workpiece positioner whereby the degree of positioning friction is selectively controlled by the operator.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF THE PREFERRED EMBODIMENT

Figure 1:
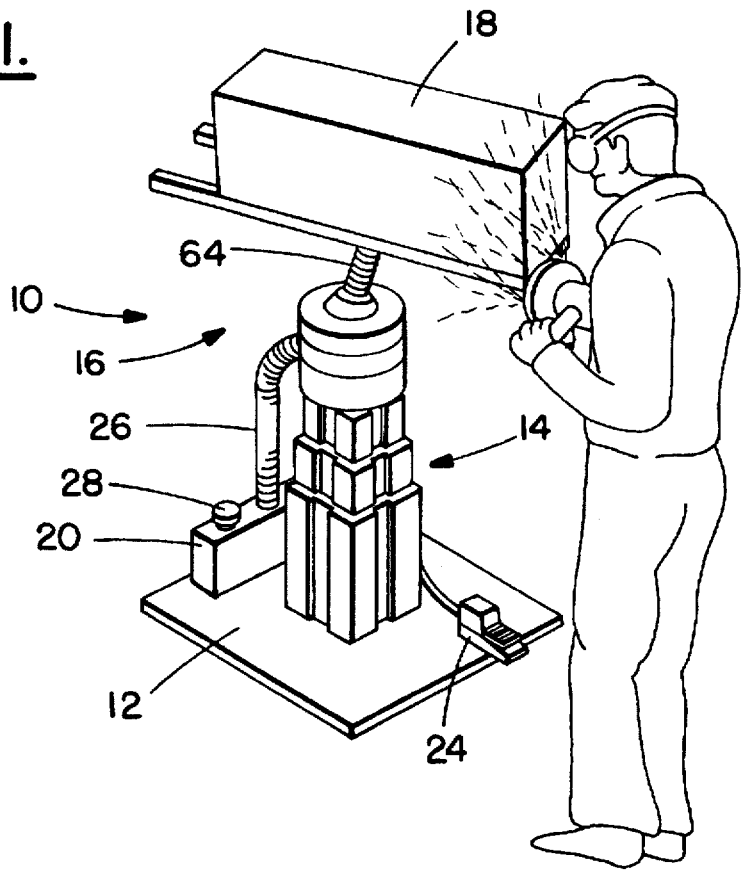
FIG. 1 is a perspective view of the workpiece holder with an associated pedestal and mount.

Referring now to the drawings and more particularly to FIG. 1 there is shown an operator working with the workpiece positioner 10 of the present invention. A support plate 12 serves to mount the positioner which includes a pedestal 14 supporting the workpiece holder 16. A workpiece 18 of any convenient size and configuration is secured by any suitable means to the workpiece holder 16. As will be described hereinafter, a pneumatic system is provided to release the workpiece under the control of the operator. The pneumatic system includes a source of pneumatic pressure (not shown) connected to a pneumatic control mechanism 20 housed in a control box. The control system may be operated by a foot pedal 24 and a hose or tube 26 connects the control system to the workpiece holder 16. The pneumatic control system serves to apply fluid under an operator controlled regulator pressure level through regulator 28 to the workpiece holder.

Figure 2:
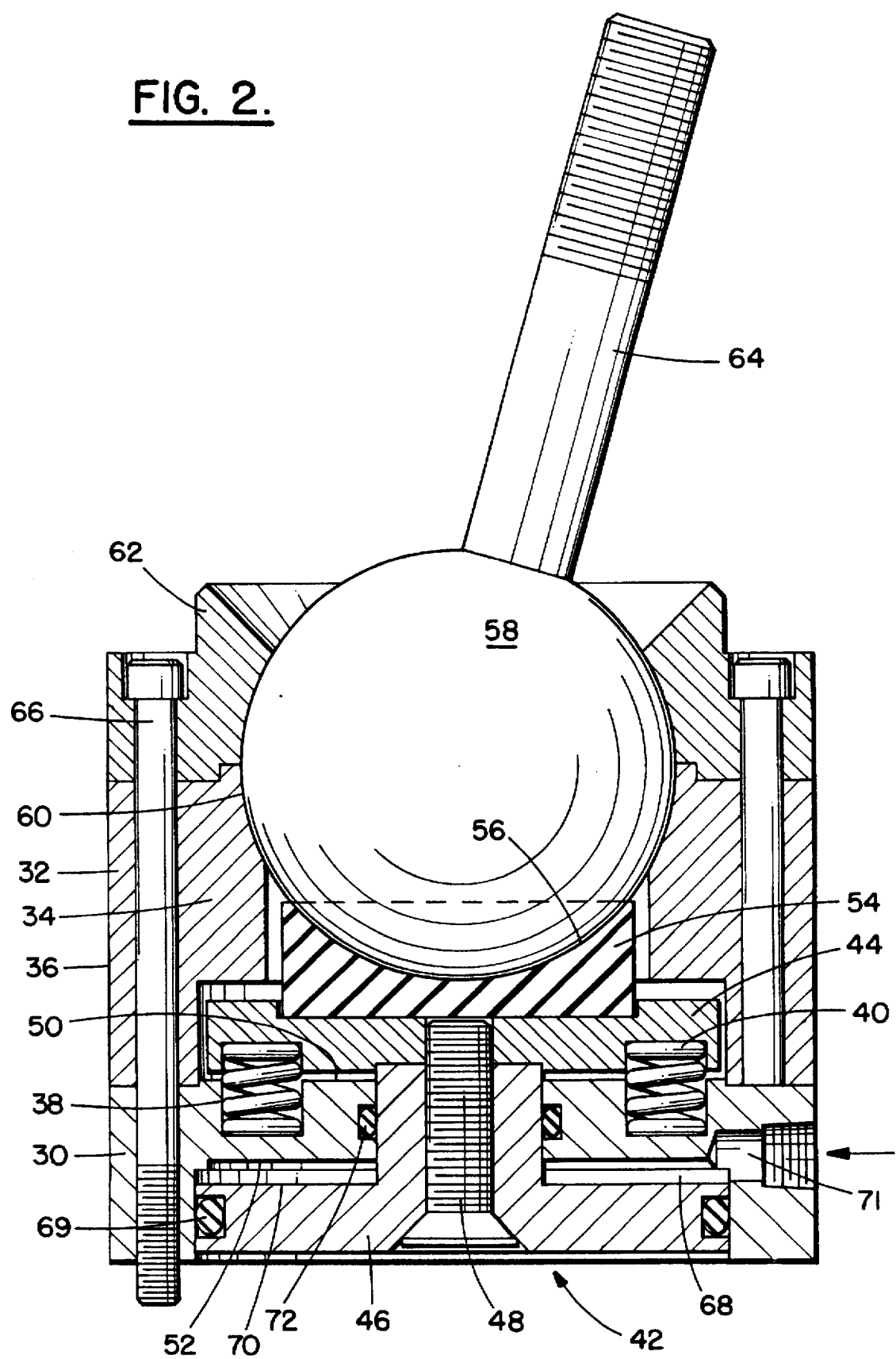
FIG. 2 is a sectional view of the workpiece holder of the present invention.
Figure 3:
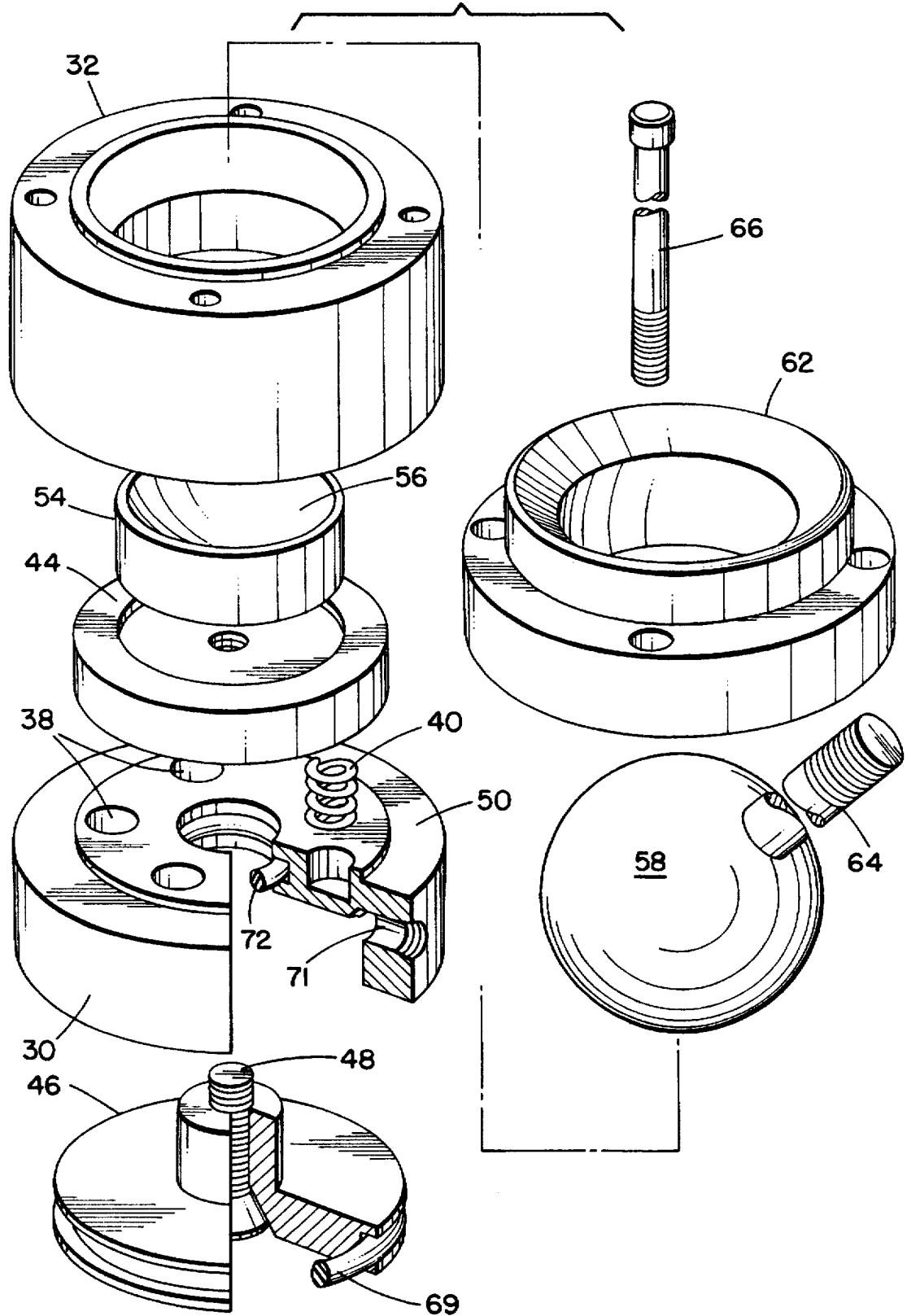
FIG. 3 is an exploded view of the workpiece holder of FIG. 2.

Referring now to FIG. 2 and 3, there is shown the construction of an embodiment of the workpiece holder 16. A circular base plate 30 supports a cylinderical casing 32 that has an upper inwardly extending portion 34 and a lower portion 36. A circular array of recesses 38 are formed in the upper surface of base plate 30 to receive coil springs 40. A piston 42 is provided having an upper cylinderical section 44 and a lower section 46 joined together by screw 48.

It is seen that the upper section 44 of piston 42 overlays the upper surface 50 of base plate 30, whereas the lower section 46 of the piston underlays the under surface 52 of base plate 30. Further, the distance between the upper surface of piston section 46 and the lower surface of piston section 44 exceeds the thickness of base plate 30 where it extends between the two piston sections such that a predetermined spring compression force is determined while still allowing the piston to move up and down relative to the base plate.

The upper surface of piston section 44 is recessed to receive a circular lockpad 54 which has a spherical upper surface 56 that receives a spherical ball 58. An upper socket ring 62 rests upon lower casing 32 positioned on top of base plate 30. Both the inner surfaces 60 of the casing 32 and socket ring 62 are of the same radius of curvature as the ball 58 so that these surfaces along with surface 56 of the lockpad provide a socket within which ball 58 may rotate.

Socket ring 62 is opened at the top to permit movement to the ball to which is secured an arm 64 that may be threaded at the end to conveniently hold a workpiece. The assembly is held together by machine screws 66 passing through holes in the socket ring 62, casing 32 and received in associated openings in base plate 30. In this manner the workpiece holder elements are held together in a tight unitary structure. With the screws 66 tightened the ball 58, lockpad 54, and piston 42 are forced slightly downward so that the springs 40 are in further compression yielding an upward static force. The friction between the surface 56 of lockpad 54 and the portion of the ball 58 engaging the spherical surface of socket ring 62 is such that the ball and its associated arm and attached workpiece are held in a fixed locked position. The lockpad 54 is of a high frictional material to cause sufficent friction to maintain the ball in a fixed position under the compression of the springs.

A circular channel 68 is formed by the upper surface of piston lower section 46 and the lower surface of the inwardly extending portion of base plate 30. This channel connects through a threaded pneumatic inlet opening 71 to the source of fluid pressure. The outer surface of the lower section 46 of the piston as well as the upper inner surface of base plate 30 are recessed to receive O-rings 69 and 72 to effectively seal the movement surfaces. Thus, when it is desired to release the workpiece holder to reposition the workpiece, a controlled amount of fluid pressure is passed through opening 71 into the circular channel 68 providing the appropriate dynamic downward force against the upper surface of lower piston section 46 to lower the piston and lockpad 54 to permit controlled motion of ball 58.

A particularly novel feature of the present invention is that the piston formed of two sections has an area between these sections that permits the stationary base plate 30 to extend inwardly within the piston 42. As a result, surface 70 which receives the dynamic fluid pressure can be made considerably larger than the corresponding surface in prior U.S. Pat. No. 5,314,174 and thus fluid pressure can exert a much greater pressure urging the piston to its release position. Correspondingly, the network of springs can be made to have a greater force providing the locking of the workholder in its predetermined position and as a result larger workpieces can be readily handled by the present design.

Figure 5:
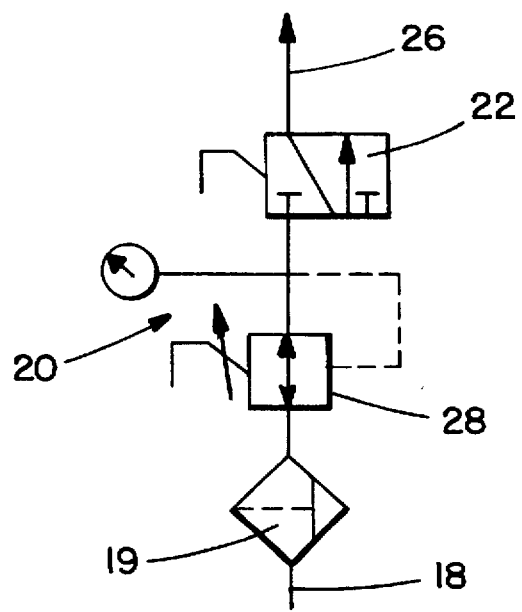
FIG. 5 is a schematic view of the pneumatic control system.

Referring to FIG. 5 there is schematically shown the pneumatic system comprising the pneumatic control mechanism 20 and foot pedal controlled valve 22. The air supply connected to hose 18 is passed through a filer 19 to a pressure regulator 28 which may be manually adjustable to control the pressure for the system. This pressure creates the downward force that counteracts the spring pressure providing a force component that causes a proportional retraction of piston 42 and ball 58 from its engagement with the lockpad 56. It is understood that an excess of pneumatic pressure will free the ball from the lockpad 56 and permit it to freely rotate with the attached workpiece in an uncontrolled manner. To prevent this, the operator will adjust the regulator 28 to provide appropriate pressure to only partially overcome the lockpad ball friction providing adjustment firmness and overall stability to the positioning system. In this manner, the arm 64 with the attached workpiece can securely be manually moved by the operator to a new desired position.

Figure 4:
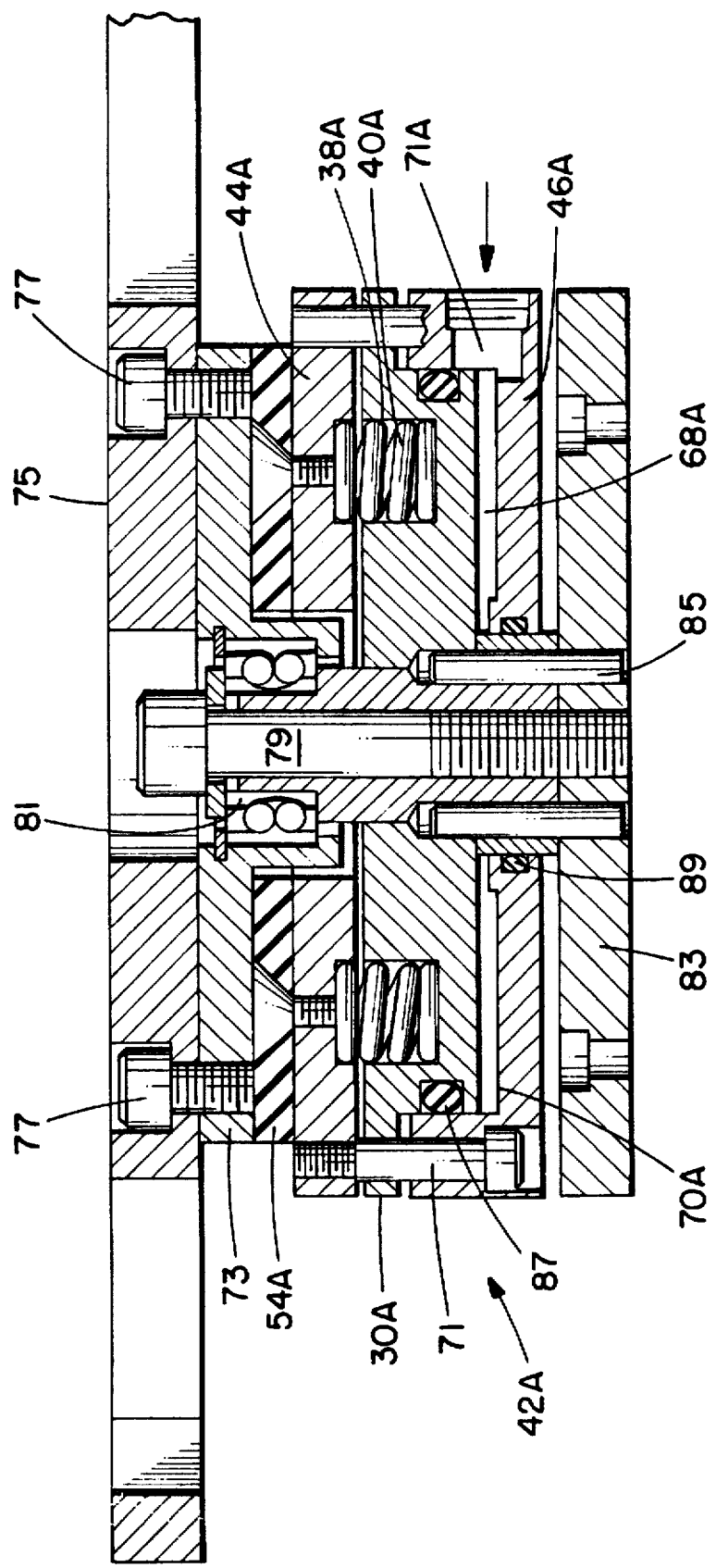
FIG. 4 is a sectional view of another embodiment of the present invention.

Referring now to FIG. 4 there is shown another embodiment of the invention in which the workpiece is secured to a turntable rather than to a ball and socket mechanism as above described. Elements in the FIG. 4 embodiment corresponding to the elements above described will carry the same numbers with a suffix A.

The workpiece positioning mechanism is secured to a bottom plate 83 which in turn may be secured to the pedestal 14 of FIG. 1 in any suitable manner. The piston, mounted for reciprocating movement is designated 42A and comprises an upper section 44A secured to a lower piston section 46A by a circular array of machine screws 71, one of which is shown in the sectional view of FIG. 4. Base member 30A is positioned between the two sections of piston 42A and has an upper surface containing a series of recesses 38A that receive coil springs 40A. The upper end of each coil spring is received in a corresponding recess in the under surface of piston upper section 44A. In this manner the piston is urged upward by the series of coil springs. Lock friction plate 54A is located to contact the upper surface of piston 42A and in turn bears against a top plate 73 which is secured to turntable 75 by machine screws 77.

The workpiece (not shown) is secured by any suitable means to the upper surface of turntable 75 which is normally held in a secured position by the action of springs 40A exerting a predetermined controllable upper force on piston 42A such that the upper surface of lock friction plate 54A will push against the under surface of top plate 73. It is understood that the top plate 73 when not held stationary by the action of piston 42A is free to rotate about bearing 81. Dowles 85 of which there may be multiples, two of which are shown in FIG. 4 pass through bottom plate 83 assuring fixation of system against base. As in the above described embodiment of FIG.'S 2, 3 it is seen that the distance between the lower surface of piston upper section 44A and the upper surface of lower piston section 46A accurately exceeds the thickness of base 30A permitting the piston to move up and down under a predetermined spring compression force. A circular channel 68A between the base 30A and piston lower section 46A is connected to a source of fluid pressure through port 71A. The circular channel is effectively sealed by O-rings 87 and 89.

The operation of the embodiment of FIG. 4 is similar to that above described in that in the absence of fluid pressure at port 71A, springs 40A urge the piston upwardly so that lock plate 54A bears against the top plate 73 to retain the turntable in a fixed non-rotatable position. When it is desired to permit rotation of the turntable controlled amount of fluid pressure is admitted through port 71A and into channel 68A to provide the appropriate dynamic downward force against the surface 70A of piston lower section 46A to urge the piston downward thus releasing the turntable for controlled rotation.

Having thus described the invention with particular reference to the preferred forms thereof, it will be obvious that various changes and modifications may be made therein without departing from the spirit and scope of the invention as defined in the appended claims.

What is claimed is:

1. A workpiece positioner comprising:
 - a cylindrical base member;
   cylindrical piston means having an upper section and a lower section;
   said piston upper section and said piston lower section being secured together and adapted to move as a unitary unit;

said cylindrical base member being partially positioned between said piston upper section and said piston lower section;

workpiece holding means friction means positioned between the piston means and the workpiece holding means;

spring means positioned between said base member and said piston upper section to urge said piston upward to hold said workpiece holding means in a fixed position; and a fluid chamber in operative relation between said base member and the said piston lower section to urge the said piston downward to release said workpiece holding means when fluid pressure is admitted to said fluid chamber.

2. The workpiece positioner of claim 1 in which the workpiece holding means comprises ball and socket means.

3. The workpiece position of claim 1 in which the workpiece holding means comprises a turntable means.

4. A workpiece positioner comprising:

a cylindrical base member;

cylindrical piston means having an upper section and a lower section;

said piston upper section and said piston lower section being secured together and adapted to move as a unitary unit;

said cylindrical base member being partially positioned between said piston upper section and said piston lower section;

workpiece holding means;

friction means positioned between the piston means and the workpiece holding means;

spring means positioned between said base member and said piston upper section to urge said piston upward to hold said workpiece holding means in a fixed position;

a fluid chamber in operative relation between said base member and the said piston lower section to urge the said piston downward to release said workpiece holding means when fluid pressure is admitted to said fluid chamber;

said fluid chamber being partially formed by a surface of said piston lower section and a surface of said base member.

5. The workpiece positioner of claim 4 in which the workpiece holding means comprises ball and socket means.

6. The workpiece position of claim 4 in which the workpiece holding means comprises a turntable means.

7. A workpiece positioner comprising:

a cylindrical disc base member having an upper surface and a lower surface;

a piston having an upper section and a lower section secured together to form a unitary unit;

workpiece holding means having a workpiece locking position and workpiece release position;

friction means positioned between the piston means and workpiece holding means;

said piston upper section and piston lower section each having an upper surface and a lower surface;

said cylindrical base member and said piston upper section and piston lower section being co-axial;

said cylindrical base member extending between said piston upper section and the said piston lower section;

the lower surface of said piston upper section being adjacent the upper surface of said base member;

spring means positioned between and in contact with the lower surface of said piston upper section and the upper surface of said base member to urge the said piston upward to actuate the workpiece holding means to the workpiece locking position;

the upper surface of said piston lower section being adjacent the lower surface of said base member and forming a fluid chamber;

means to apply fluid pressure to said fluid chamber to urge said piston downward to actuate the workpiece holding means to the workpiece release position.

8. The workpiece positioner of claim 7 in which the workpiece holding means comprises a ball and socket means.

9. The workpiece positioner of claim 7 in which the workpiece holding means comprises a turntable means.

10. A workpiece positioner comprising:

a base member;

piston means having a first section and a second second;

said piston first section and said piston second section being secured together and adapted to move as a unitary unit;

said cylindrical base member being partially positioned between said piston first section and said piston second section;

workpiece holding means;

friction means positioned between the piston means and the workpiece holding means;

spring means positioned between said base member and said piston first section to urge said piston in a first direction to hold said workpiece holding means in a fixed position;

a fluid chamber in operative relation between said base member and the said piston second section to urge the said piston in a second direction to release said workpiece holding means when fluid pressure is admitted to said fluid chamber;

said fluid chamber being partially formed by a surface of said piston second section and a surface of said base member.

11. The workpiece positioner of claim 10 which said workpiece holding means comprises a ball and socket means.

12. The workpiece positioner of claim 10 in which said workpiece positioner comprising a turntable means.

* * * * *